US012652748B2

(12) United States Patent
Pan et al.

(10) Patent No.: US 12,652,748 B2
(45) Date of Patent: Jun. 9, 2026

(54) REMOTE PLASMA SOURCE (RPS) POWER COUPLING CIRCUIT AND CONTROL SYSTEM

(71) Applicant: JIANGSU SHENZHOU SEMICONDUCTOR TECHNOLOGY CO., LTD, Yangzhou (CN)

(72) Inventors: Xiaogang Pan, Yangzhou (CN); Xiaojun Gu, Yangzhou (CN); Yinzhi Shu, Yangzhou (CN); Peiwen Zhu, Yangzhou (CN)

(73) Assignee: JIANGSU SHENZHOU SEMICONDUCTOR TECHNOLOGY CO., LTD, Yangzhou (CN)

( * ) Notice: Subject to any disclaimer, the term of this patent is extended or adjusted under 35 U.S.C. 154(b) by 0 days.

(21) Appl. No.: 19/309,670

(22) Filed: Aug. 26, 2025

(65) Prior Publication Data

US 2026/0040428 A1 Feb. 5, 2026

Related U.S. Application Data

(63) Continuation of application No. PCT/CN2025/087238, filed on Apr. 3, 2025.

(30) Foreign Application Priority Data

Aug. 5, 2024 (CN) ........................ 202411065668.4

(51) Int. Cl.
*H05H 1/46* (2006.01)

(52) U.S. Cl.
CPC ....... *H05H 1/4652* (2021.05); *H05H 2242/22* (2021.05)

(58) Field of Classification Search
CPC ......................... H05H 1/4652; H05H 2242/22
See application file for complete search history.

(56) References Cited

U.S. PATENT DOCUMENTS

| | | | |
|---|---|---|---|
| 2004/0026231 A1 | 2/2004 | Pribyl et al. | |
| 2011/0222315 A1 | 9/2011 | Lee et al. | |
| 2018/0294732 A1 | 10/2018 | Ye et al. | |

FOREIGN PATENT DOCUMENTS

| | | |
|---|---|---|
| CA | 2607733 A1 | 4/2008 |
| CN | 1700554 A | 11/2005 |

(Continued)

OTHER PUBLICATIONS

He Min, et al., A high power plasma torch supply system and control strategy, Nuclear Fusion and Plasma Physics, 2023, pp. 312-316, vol. 43, No. 3.

*Primary Examiner* — Henry Luong
(74) *Attorney, Agent, or Firm* — Bayramoglu Law Offices LLC

(57) ABSTRACT

A remote plasma source (RPS) power coupling circuit and a control system are provided. The RPS power coupling circuit includes a direct-current (DC) voltage source, two current sharing circuits, a three-winding transformer, and a chamber load, where the current sharing circuits each include a full-bridge inverter circuit, a resonant converter, and a current sharing resistor $R_o$; the DC voltage source is input to the full-bridge inverter circuit; the resonant converter is connected to the full-bridge inverter circuit; the resonant converter includes an inductor $L_r$, a capacitor $C_r$, and an inductor $L_k$; the inductor $L_r$ is connected to the full-bridge inverter circuit; the inductor $L_k$ is connected to the three-winding transformer; the current sharing resistor $R_o$ is connected to the inductor $L_k$; and the three-winding transformer includes primary winding coils respectively (Continued)

connected to the two current sharing circuits, and a secondary winding coil connected to the chamber load.

4 Claims, 3 Drawing Sheets

(56) References Cited

FOREIGN PATENT DOCUMENTS

| | | | |
|---|---|---|---|
| CN | 102723873 | A | 10/2012 |
| CN | 106329940 | A | 1/2017 |
| CN | 207732652 | U | 8/2018 |
| CN | 108648899 | A | 10/2018 |
| CN | 110535347 | A | 12/2019 |
| CN | 111669060 | A | 9/2020 |
| CN | 111987923 | A | 11/2020 |
| CN | 112467998 | A | 3/2021 |
| CN | 113179020 | A | 7/2021 |
| CN | 116155112 | A | 5/2023 |
| CN | 116345918 | A | 6/2023 |
| CN | 117545162 | A | 2/2024 |
| CN | 118900492 | A | 11/2024 |

REMOTE PLASMA SOURCE (RPS) POWER COUPLING CIRCUIT AND CONTROL SYSTEM

CROSS REFERENCE TO THE RELATED APPLICATIONS

This application is a continuation application of International Application No. PCT/CN2025/087238, filed on Apr. 3, 2025, which is based upon and claims priority to Chinese Patent Application No. 202411065668.4, filed on Aug. 5, 2024, the entire contents of which are incorporated herein by reference.

TECHNICAL FIELD

The present disclosure relates to the technical field of semiconductor manufacturing, and in particular to a remote plasma source (RPS) power coupling circuit and control system.

BACKGROUND

As a device for generating plasma, the RPS is typically used in photovoltaic, chemical, semiconductor and related fields. According to the prior art, to improve system cleaning efficiency, a gas is charged at a higher flow rate for reaction, and thus the RPS requires a higher power output. In this embodiment, a coupling transformer is connected to multiple power modules in parallel to realize the high-power output. However, during power boosting, current sharing on loads of multiple circuits is highly demanded. If the current sharing of the system is not controlled accurately, the load with a higher output current suffers a larger current stress to potentially cause system crash. Hence, how to ensure uniform current sharing of each power module during the power boosting of the plasma source has become a problem to be solved urgently by those skilled in the art.

The high frequency power converter has been widely applied to power systems. However, as the system capacity is expanded, the centralized power supply has a large electrical stress, bringing difficulties to selection of the power device, and improvement of the switching frequency, heat dissipation and power density. Moreover, when the sole power supply experiences an internal failure, it will trigger the system crash to reduce redundancy. Since multiple low-power modules are connected in parallel, changing the number of the parallel-connected low-power modules can be adapted to requirements of different loads, thereby making the design flexible, and effectively improving the redundancy and reliability of the system.

Following parallel connection of a circuit of the RPS, current sharing between the power modules is problematic. The current between the modules is distributed unreasonably for parameter differences between the parallel modules, enabling the system to work in an extremely unstable state. Particularly for low-voltage and high-current application scenarios, subtle parameter differences also cause significant current distribution unevenness. Hence, module-parallel current sharing technologies directly restrict development of a high-capacity modular power supply system of the RPS. The module-parallel current sharing technologies can be classified into an external characteristic current sharing method and an active current sharing method. The external characteristic current sharing method cannot achieve a trade-off between load regulation and current sharing accuracy, making it unsuitable for medium and high-power occasions.

At present, the active current sharing method mainly includes a master-slave current sharing method, an external current sharing controller method, a maximum current sharing method, and an average current sharing method. Both the master-slave current sharing method and the maximum current sharing method are essentially master-slave control, in which the designation of a master module can reduce the redundancy and reliability of the whole system. For the auto-master-slave method, due to switching of the master module, the response speed of the system is relatively slow. The external current sharing controller method makes the system highly complex and thus is not conducive to actual application. Without master-slave arrangement, the average current sharing method has advantages of fast response speed, high current sharing accuracy, relatively simple control, etc.

At present, to improve the power output of the RPS, a circuit structure with power modules parallel-connected in two circuits is typically used. Due to impedance variations between the modules, currents output from the two circuits are distributed unevenly, and the voltage on the current sharing bus is reduced, resulting in reduced voltage of the two modules in the parallel-connected system. Consequently, the load with the high output current suffers the large current stress to potentially cause the system crash. Therefore, ensuring the uniform current sharing of each power module during the power boosting of the plasma source has become a problem to be solved urgently in the art.

SUMMARY

In view of defects of the prior art, the present disclosure provides an RPS power coupling circuit and control system, to realize uniform current sharing for each power module of the existing remote plasma source.

According to a first aspect, the present disclosure provides an RPS power coupling circuit, including a direct-current (DC) voltage source, two current sharing circuits that are connected in parallel, a three-winding transformer, and a chamber load, where the current sharing circuits each include:

- a full-bridge inverter circuit, the DC voltage source being input to the full-bridge inverter circuit;
- a resonant converter connected to the full-bridge inverter circuit, where the resonant converter includes an inductor $L_r$, a capacitor $C_e$, and an inductor $L_k$; the inductor $L_r$ is connected to the full-bridge inverter circuit; and the inductor $L_k$ is connected to the three-winding transformer; and
- a current sharing resistor $R_o$ connected to the inductor $L_k$;
- where, the three-winding transformer includes primary winding coils respectively connected to the two current sharing circuits, and a secondary winding coil connected to the chamber load.

Optionally, a magnetic core of the three-winding transformer is a T-shaped transformer magnetic core; the primary winding coil of the three-winding transformer is wrapped at a middle of the T-shaped transformer magnetic core; and the secondary winding coil of the three-winding transformer is wrapped at two sides of the T-shaped transformer magnetic core.

According to a second aspect, the present disclosure provides an RPS power coupling control system, applied to the RPS power coupling circuit of any possible form in the first aspect, and including a power loop, a current loop, and a current sharing loop, where the power loop serves as an outer loop of a control system; the current sharing loop and the power loop act concurrently; and the current loop serves as an inner loop of the control system.

Optionally, the current sharing loop is specifically configured to:

acquire two terminal voltages $V_a$, $V_b$ of the current sharing resistor $R_o$, and acquire voltage errors $e_r$, $e_r'$;

where, if output currents $i_o$, $i_o'$ of primary windings are the same, the voltage errors $e_r$, $e_r'$ are zero, and the current sharing loop outputs zero.

Optionally, the power loop is specifically configured to:

respectively acquire output voltages $V_o$, $V_o'$ and the output current $i_o$, $i_o'$ of two primary windings, and acquire output powers $P_o$, $P_o'$ of the two primary windings;

acquire power errors $e_r$, $e_r'$ according to a preset reference power $P_o$* and the output powers $P_o$, $P_o'$; and perform power loop proportional-integral (PI) adjustment according to the power errors $e_o$, $e_o'$.

Optionally, the current loop is specifically configured to:

acquire output current reference values $i_{o1}$, $i_{o2}$ upon the power loop PI adjustment, and determine an average filtered value $\bar{i}_o$ according to the output current reference values $i_{o1}$, $i_{o2}$;

acquire current errors $e_s$, $e_s'$ according to the average filtered value $\bar{i}_o$, the output current $i_o$, $i_o'$, and the voltage errors $e_r$, $e_r'$;

acquire current loop errors $e_{o1}$, $e_{o2}$ according to the output current reference values $i_{o1}$, $i_{o2}$, the voltage errors $e_r$, $e_r'$ and the average filtered value $\bar{i}_o$; and perform current loop PI adjustment according to the current loop errors $e_{o1}$, $e_{o2}$.

Optionally, the RPS power coupling control system further includes a controller and a pulse-width modulation (PWM) modulator;

the controller is configured to acquire a switching frequency and a duty cycle upon the current loop PI adjustment; and the PWM modulator is configured to control and output a pulse signal according to the switching frequency and the duty cycle, thereby controlling on-off of switching transistors S1-S4.

With the above technical solutions, the present disclosure has the following beneficial effects:

According to the RPS power coupling circuit provided by the present disclosure, through the transformer, the two current sharing circuits can boost an output power of the RPS. Through the transformer, an automatic current sharing effect of hardware is realized.

The control system provided by the present disclosure makes use of a three-loop control strategy including the power loop, the current loop and the current sharing loop. The power loop serves as the outer loop of the control system, the current loop serves as the inner loop of the control system, and the current sharing loop and the power loop act concurrently, rendering the RPS power coupling circuit structurally simple, and desirable in current sharing effect.

BRIEF DESCRIPTION OF THE DRAWINGS

In order to illustrate the specific embodiments of the present disclosure or the technical solutions in the prior art more clearly, accompanying drawings needing to be used in the description of the specific embodiments or the prior art will be briefly described below. In all the accompanying drawings, similar elements or portions are generally identified by similar reference numerals. In the accompanying drawings, each element or portion is not necessarily drawn to the actual scale.

DETAILED DESCRIPTION OF THE EMBODIMENTS

The embodiments of the technical solutions of the present disclosure will be described in detail below with reference to the accompanying drawings. The following embodiments are only used to more clearly illustrate the technical solutions of the present disclosure, and thus are merely exemplary and are not intended to limit the protection scope of the present disclosure.

It should be noted that the technical terms or scientific terms used herein should have the ordinary meanings as understood by those skilled in the art to which the present disclosure belongs, unless otherwise stated.

Figure 1:
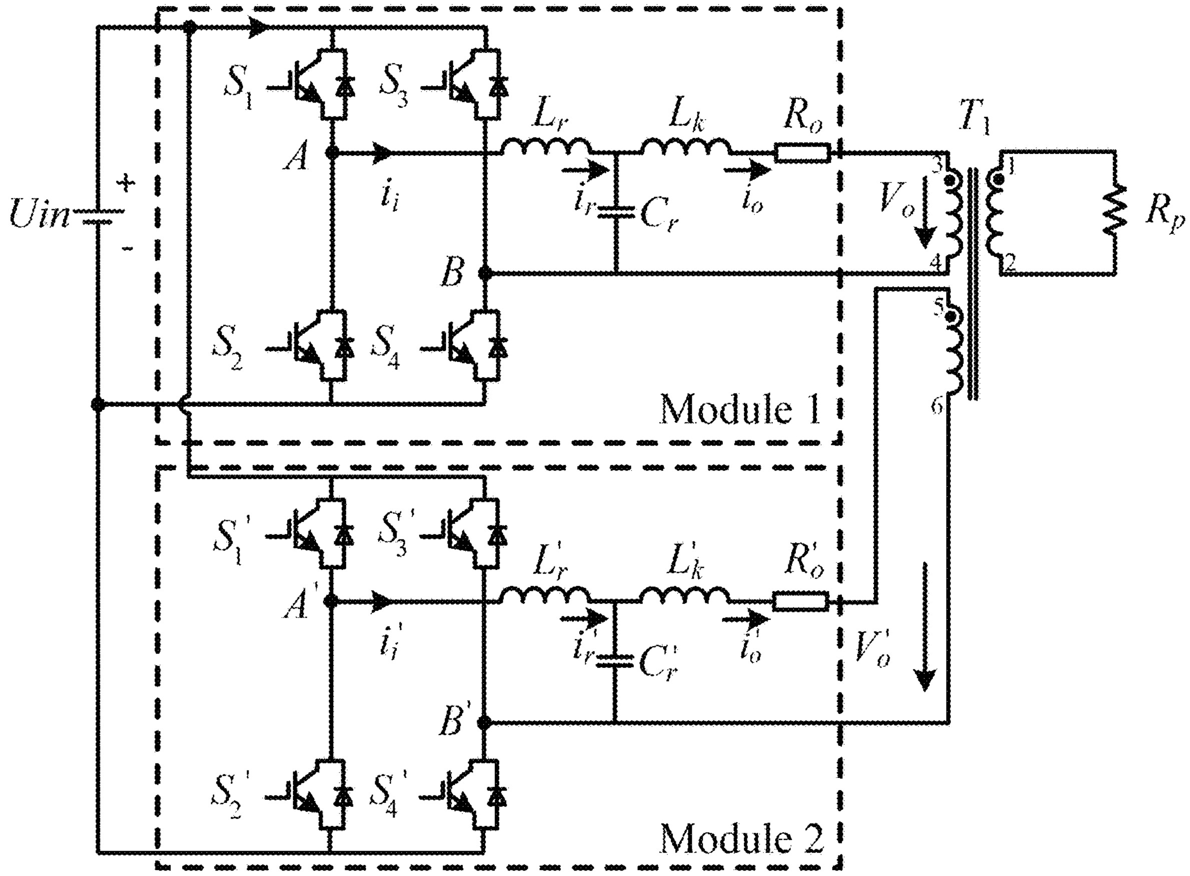
FIG. 1 is a schematic diagram of an RPS power coupling circuit according to an embodiment of the present disclosure.

As shown in FIG. 1, an embodiment provides an RPS power coupling circuit, including a DC voltage source, two current sharing circuits that are connected in parallel, a three-winding transformer, and a chamber load. The two current sharing circuits are the same. The current sharing circuits each include a full-bridge inverter circuit, a resonant converter, and current sharing resistor $R_o$. The DC voltage source is input to the full-bridge inverter circuit. The resonant converter is connected to the full-bridge inverter circuit. The resonant converter includes inductor $L_r$, capacitor $C_r$, and inductor $L_k$. The inductor $L_r$ is connected to the full-bridge inverter circuit. The inductor $L_k$ is connected to the three-winding transformer. The current sharing resistor $R_o$ is connected to the inductor $L_k$. The three-winding transformer includes primary winding coils respectively connected to the two current sharing circuits, and a secondary winding coil connected to the chamber load.

Figure 2A:
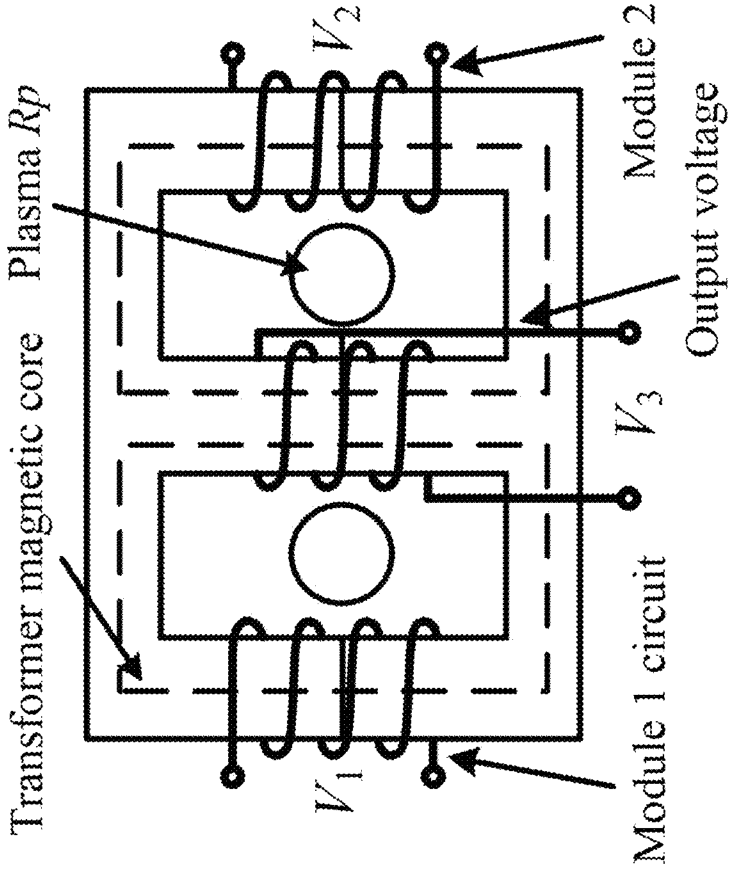
FIGS. 2A-2B are schematic diagrams of a magnetic core of a three-winding transformer according to an embodiment of the present disclosure.
Figure 2B:
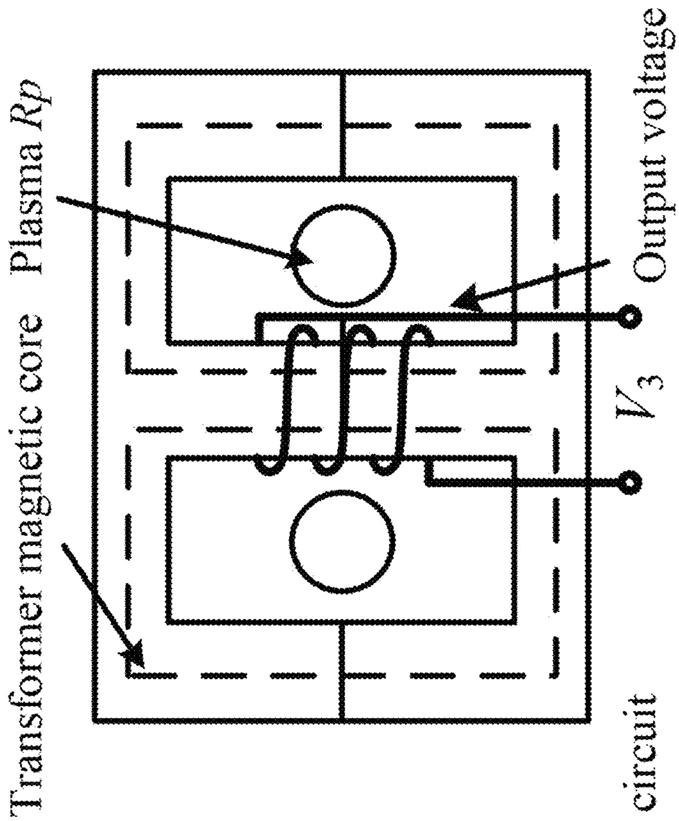

As shown in FIG. 2A, a magnetic core of the three-winding transformer is a T-shaped transformer magnetic core. The primary winding coil of the three-winding transformer is wrapped at a middle of the T-shaped transformer magnetic core. The secondary winding coil of the three-winding transformer is wrapped at two sides of the T-shaped transformer magnetic core. $V_1$ and $V_2$ are respectively connected to outputs of the two current sharing circuits. $V_3$ serves as an output voltage of the three-winding transformer. FIG. 2B shows a structure of an existing transformer, in which a winding coil of the transformer is wrapped at a middle of the T-shaped transformer, and $V_3$ serves as an output voltage. Through a structure in which the two current sharing circuits are connected in parallel, and through such parameter design as a turn ratio of the transformer, and a number of winding turns, the three-winding transformer T1 improves a coupling coefficient, realizing automatic current sharing between the two current sharing circuits more easily from a hardware level, and boosting the output power of the RPS.

Figure 3:
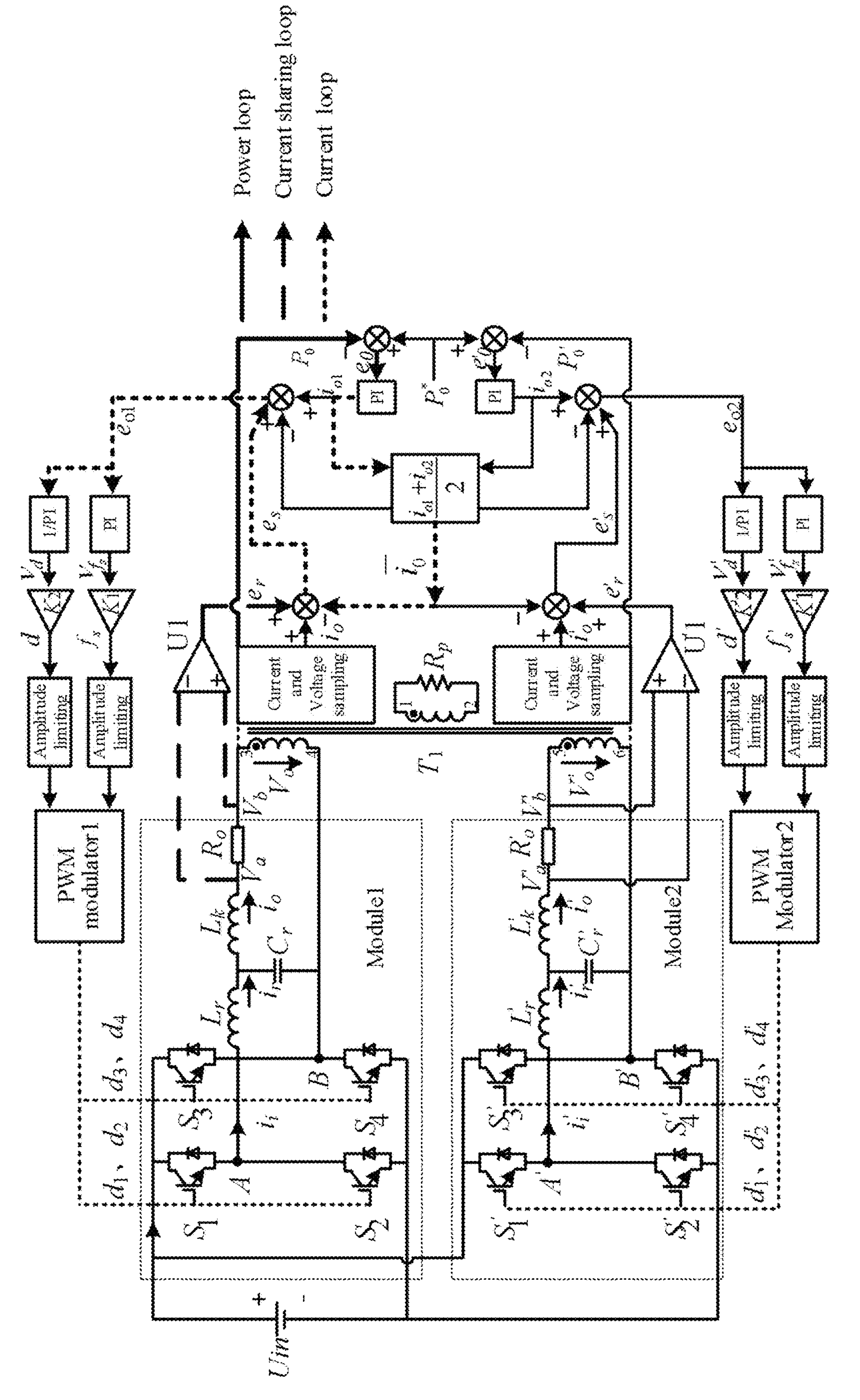
FIG. 3 is a schematic diagram of an RPS power coupling control system according to an embodiment of the present disclosure.

According to the RPS power coupling circuit provided by the present disclosure, the two current sharing circuits are connected in parallel through the coupling transformer, which can boost the output power of the RPS. Through the transformer, the automatic current sharing effect of hardware is realized. However, primary windings of the modules are varied in the inductance, number of turns, coupling coefficient, and the like, resulting in a current error in current sharing of each module. Therefore, as shown in FIG. 3, an embodiment further provides an RPS power coupling control system, which is applied to the RPS power coupling circuit provided by the foregoing embodiment to ensure a uniform output current between the current sharing circuits. FIG. 3 takes one current sharing circuit as an example. For each current sharing circuit, a control system includes a power loop, a current loop, and a current sharing loop. The power loop serves as an outer loop of the control system. The current sharing loop and the power loop act concurrently. The current loop serves as an inner loop of the control system. The other current sharing circuit is arranged in a same way.

Referring to FIG. 3, the current sharing loop is specifically configured to:

acquire two terminal voltages $V_a$, $V_b$ of the current sharing resistor $R_o$, and acquire voltage errors $e_r$, $e_r'$.

If output currents $i_o$, $i_o'$ of primary windings of the two current sharing circuits are the same, the voltage errors $e_r$, $e_r'$ are zero, and the current sharing loop outputs zero.

After the two current sharing circuits with the current sharing ring respectively sample the two terminal voltages of the current sharing resistors $R_o$, $$R_o^{`}, V_b = V_b^{`}.$$

Current sharing controllers U1, U1' are configured to compare the output voltage errors $e_r$, $e_r'$ of the two current sharing circuits. When the output currents $i_o$ and $i_o'$ of the primary windings of the two current sharing circuits are the same, output voltages of the two current sharing circuits are the same as a voltage signal on a current sharing bus, no current flows through the current sharing resistors, and the current sharing loop outputs zero. By this time, three-loop control can be simplified to two-loop control, and the control from the current sharing loop is omitted.

Specifically, the control system is configured to perform tracking control on output currents of module 1 and module 2. In order that the output currents $i_o$, $i_o'$ of the two modules are the same, namely the voltage errors $e_r$, $e_r'$ output by the two current sharing controller U1, U1' are the same, the control system in the embodiment makes use of the three-loop control of the current sharing loop, the power loop and the current loop to ensure that the output currents of the two current sharing circuits are the same.

Referring to FIG. 3, the power loop is specifically configured to:

respectively acquire output voltages $V_o$, $V_o'$ and the output current $i_o$, $i_o'$ of the two primary windings, and acquire output powers $P_o$, $P_o'$ of the two primary windings;

acquire power errors $e_o$, $e_o'$ according to a preset reference power $P_o^*$ and the output powers $P_o$, $P_o'$; and perform power loop PI adjustment according to the power errors $e_o$, $e_o'$.

Referring to FIG. 3, the current loop is specifically configured to:

acquire output current reference values $i_{o1}$, $i_{o2}$ upon the power loop PI adjustment, and determine an average filtered value $\bar{i}_o$ according to the output current reference values $i_{o1}$, $i_{o2}$, the two current sharing circuits having the average filtered value $$\bar{i}_o = \frac{i_{o1} + i_{o2}}{2};$$

acquire current errors $e_s$, $e_s'$ according to the average filtered value $\bar{i}_o$, the output currents $i_o$, $i_o'$, and the voltage errors $e_r$, $e_r'$;

acquire current loop errors $e_{o1}$, $e_{o2}$ according to the output current reference values $i_{o1}$, $i_{o2}$, the voltage errors $e_r$, $e_r'$ and the average filtered value $\bar{i}_o$; and perform current loop PI adjustment according to the current loop errors $e_{o1}$, $e_{o2}$.

In any current sharing circuit, $V_a$ serves as a voltage of the current sharing bus, and $V_b$ can serve as an average of voltage signals of dual parallel power supplies. With comparison on the $V_a$ and the $V_b$, the current sharing controller U1 outputs the voltage error $e_r$. The sampled output current $i_o$ of the module 1 is compared with the average filtered value $\bar{i}_o$ for the output currents of the two modules, and then added with the output voltage error $e_r$ to serve as the output current error $e_s$. The output current reference value $i_{o1}$ of the module 1 is compared with the average filtered value $\bar{i}_o$ for the output currents of the two modules, and then added with the output current error $e_s$ to obtain the current loop error signal $e_{o1}$.

Optionally, the RPS power coupling control system further includes a controller and a PWM modulator. The controller is configured to acquire a switching frequency and a duty cycle upon the current loop PI adjustment. The PWM modulator is configured to control and output a pulse signal according to the switching frequency and the duty cycle, thereby controlling on-off of switching transistors S1-S4.

After the current loop errors $e_{o1}$, $e_{o2}$ are determined by the current loop, PI adjustment is performed on the current loop errors to obtain the switching frequency $f_s$, and the duty cycle d of each module. At last, the controller outputs a compensated control signal to the PWM modulator. The pulse signal is output to control the on-off of the switching transistors S1-S4. The full-bridge inverter circuit outputs an alternating current (AC) source.

The following takes the current sharing circuit of the module 1 in FIG. 3 as an example for description. Upon the current loop PI adjustment on the current loop error $e_{o1}$, output signal $V_{fs}$ is obtained. Upon amplification and amplitude limiting of K1 on the output signal $V_{fs}$, frequency signal $f_s$, of the PWM modulator 1 is obtained. By performing the current loop PI adjustment on the current loop error $e_{o1}$ and taking a reciprocal, output signal $V_d$ is obtained. Upon amplification and amplitude limiting of K2 on the output signal $V_d$, duty cycle signal d for controlling the PWM modulator 1 is obtained. The switching frequency $f_s$ is inversely proportional to the duty cycle signal d. At last, the PWM modulator 1 controls pulse signals d1-d4 to be outputted to the switching transistors S1-S4. The control of the current sharing circuit of the module 2 is the same as that of the module 1.

The embodiments described above are merely intended to describe the technical solutions of the present disclosure in detail, but the description of the foregoing embodiments is merely intended to facilitate an understanding of the method of the present disclosure, and shall not be construed as a limitation to the embodiments of the present disclosure. Any variation or replacement readily figured out by a person skilled in the art shall fall within the scope of protection of the embodiments of the present disclosure.

What is claimed is:

1. A remote plasma source (RPS) power coupling circuit, comprising: a direct-current (DC) voltage source, two current sharing circuits connected in parallel, a three-winding transformer, and a chamber load, wherein each of the two current sharing circuits comprises:

a full-bridge inverter circuit, wherein the DC voltage source is input to the full-bridge inverter circuit;

a resonant converter connected to the full-bridge inverter circuit, wherein the resonant converter comprises an inductor $L_r$, a capacitor $C_r$, and an inductor $L_k$; the inductor $L_r$ is connected to the full-bridge inverter circuit; and the inductor $L_k$ is connected to the three-winding transformer; and a current sharing resistor $R_o$ connected to the inductor $L_k$;

wherein the three-winding transformer comprises primary winding coils respectively connected to the two current sharing circuits, and a secondary winding coil connected to the chamber load;

the RPS power coupling circuit is controlled by a control system; the control system comprises a power loop, a current loop, and a current sharing loop; the power loop serves as an outer loop of the control system; the current sharing loop and the power loop act concurrently; and the current loop serves as an inner loop of the control system;

the current loop is configured to:

acquire output current reference values $i_{o1}$, $i_{o2}$ upon power loop proportional-integral (PI) adjustment, and determine an average filtered value $\bar{i}_o$ according to the output current reference values $i_{o1}$, $i_{o2}$;

acquire current errors $e_s$, $e_s'$ according to the average filtered value $\bar{i}_o$, output currents $i_o$, $i_o'$, and voltage errors $e_r$, $e_r'$;

acquire current loop errors $e_{o1}$, $e_{o2}$ according to the output current reference values $i_{o1}$, $i_{o2}$, the voltage errors $e_r$, $e_r'$, and the average filtered value $\bar{i}_o$; and perform current loop PI adjustment according to the current loop errors $e_{o1}$, $e_{o2}$; and the control system further comprises a controller and a pulse-width modulation (PWM) modulator;

the controller is configured to acquire a switching frequency and a duty cycle upon the current loop PI adjustment, and configured to perform the current loop PI adjustment on the current loop error $e_{o1}$ to obtain an output signal $v_{fs}$, and perform amplification and amplitude limiting on the output signal $v_{fs}$ to obtain a frequency signal $f_s$ of the PWM modulator; and perform the current loop PI adjustment on the current loop error $e_{o1}$ and take a reciprocal to obtain an output signal $v_d$, and perform amplification and amplitude limiting on the output signal $v_d$ to obtain the duty cycle d of the PWM modulator; and the PWM modulator is configured to control and output a pulse signal according to the switching frequency and the duty cycle, thereby controlling on-off of switching transistors S1-S4.

2. The RPS power coupling circuit according to claim 1, wherein a magnetic core of the three-winding transformer is a T-shaped transformer magnetic core; the primary winding coils of the three-winding transformer are wrapped at a middle of the T-shaped transformer magnetic core; and the secondary winding coil of the three-winding transformer is wrapped at two sides of the T-shaped transformer magnetic core.

3. The RPS power coupling circuit according to claim 1, wherein in the control system, the current sharing loop is configured to:

acquire two terminal voltages $V_a$, $V_b$ of the current sharing resistor $R_o$, and acquire the voltage errors $e_r$, $e_r'$;

wherein when the output currents $i_o$, $i_o'$ of the primary winding coils are identical, the voltage errors $e_r$, $e_r'$ are zero, and the current sharing loop outputs zero.

4. The RPS power coupling circuit according to claim 3, wherein in the control system, the power loop is configured to:

respectively acquire output voltages $V_o$, $V_o'$ and the output currents $i_o$, $i_o'$ of two primary winding coils, and acquire output powers $P_o$, $P_o'$ of the two primary winding coils;

acquire power errors $e_o$, $e_o'$ according to a preset reference power $P_o$* and the output powers $P_o$, $P_o'$; and perform the power loop PI adjustment according to the power errors $e_o$, $e_o'$.

* * * * *